United States Patent [19]

Slingerland, Jr.

[11] 4,127,938
[45] Dec. 5, 1978

[54] VEGETATION TRIMMER WITH CUTTINGS CATCHER

[76] Inventor: Henry H. Slingerland, Jr., 2800 Ramona Ct., Wilmette, Ill. 60091

[21] Appl. No.: 803,343

[22] Filed: Jun. 3, 1977

[51] Int. Cl.² .................. B26B 19/48; A01G 3/04
[52] U.S. Cl. ................................ 30/132; 56/17.1
[58] Field of Search .............. 30/131, 132, DIG. 1; 56/17.1, 17.6, 194, 202

[56] References Cited

U.S. PATENT DOCUMENTS

| 2,775,857 | 1/1957 | Holmes | 56/17.1 X |
| 3,823,472 | 7/1974 | Richards | 30/131 |
| 4,023,332 | 5/1977 | Achenbach | 56/17.1 X |

*Primary Examiner*—Jimmy C. Peters
*Attorney, Agent, or Firm*—Wegner, Stellman, McCord, Wiles & Wood

[57] ABSTRACT

A vegetation trimmer having a powered cutter arranged to cut in an upright plane. A catcher is provided for catching the cut vegetation. It includes a first upwardly opening U-shaped collecting portion underlying the cutter and having a front portion extending to substantially forwardly of the bottom of the cutter, and an upwardly opening U-shaped rear portion extending from the first portion to substantially rearwardly of the bottom of the cutter. The catcher is removably secured to a soleplate portion of the cutter which may be a hand-held cutter. A wand may be removably attached to the hand-held cutter to permit its use at foot level.

6 Claims, 5 Drawing Figures

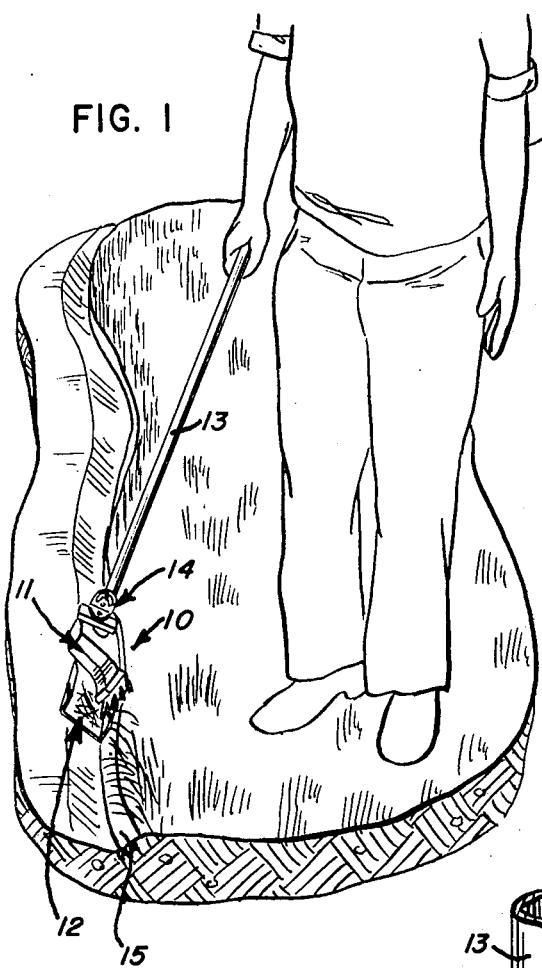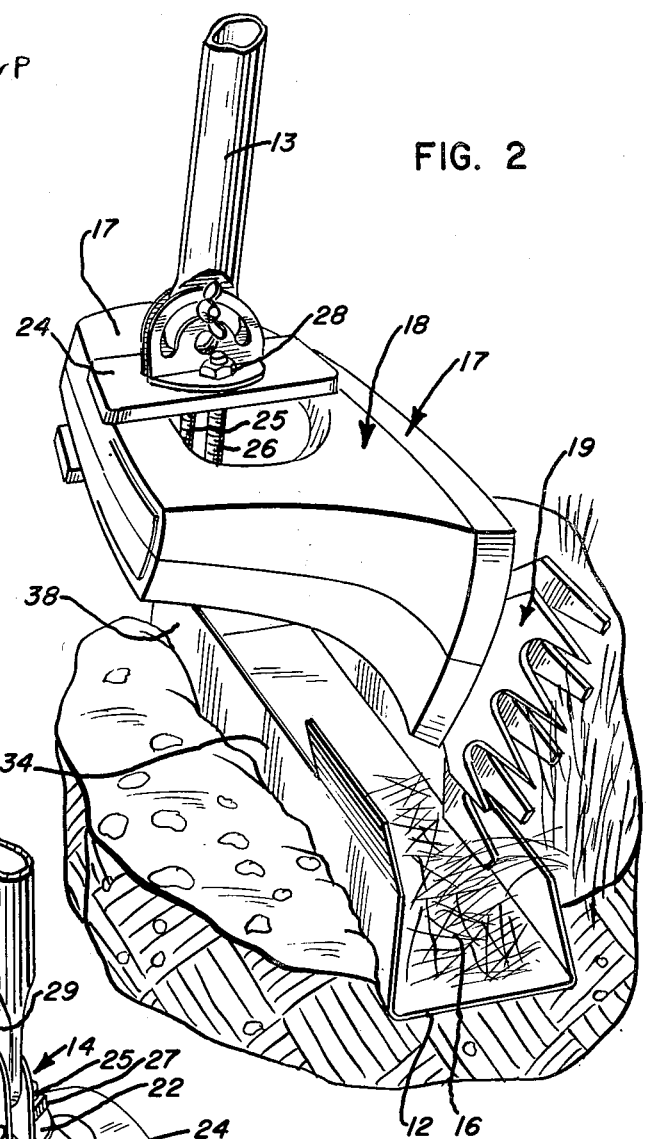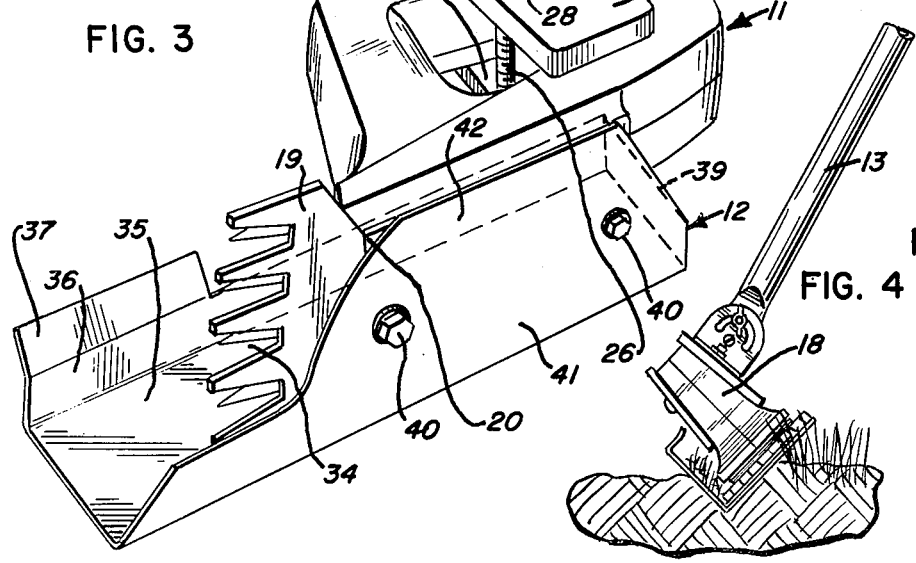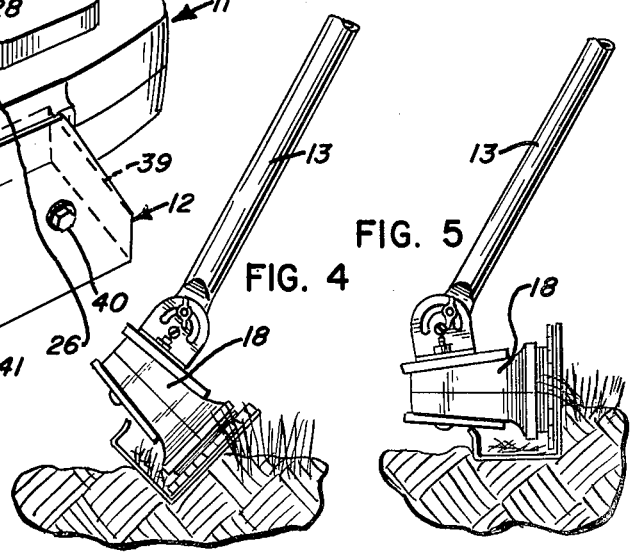

VEGETATION TRIMMER WITH CUTTINGS CATCHER

BACKGROUND OF THE INVENTION

1. Field of the Invention

This invention relates to vegetation cutting devices and in particular to vegetation trimmers.

2. Description of the Prior Art

A number of different trimming devices have been developed for use in trimming vegetation, such as bushes, grass, etc. One conventional form of such trimmer is a hand-held trimmer having powered means for operating a cutting portion.

Such trimmers are further conventionally utilized in edging operations wherein the cutting means cuts in a substantially upright plane at the edge of a lawn or the like to provide a neat cut boundary. In such applications, the edgers are normally provided with a wand, or elongated handle, permitting the user to move the cutting means along the desired path while the user remains upright.

One example of such a lawn edger and trimmer is shown in U.S. Pat. No. 2,708,335 of Thomas F. Newton. Another lawn trimmer of such general construction is shown in U.S. Pat. No. 2,538,230 of Sam H. Boggs.

An apparatus for cutting, trimming and edging vegetation and the like is also shown in U.S. Pat. No. 3,859,776 of George C. Ballas et al. The trimmers of the above discussed patents are typical of those in the present art in that they utilize different cutting means and are arranged to permit the cut vegetation to fall to the ground as the trimmer is moved along the desired boundary path.

SUMMARY OF THE INVENTION

The present invention comprehends an improved vegetation trimmer provided with means for catching the cut vegetation while yet permitting facilitated trimming action in substantially the normal manner.

The cutting means of the present invention includes a U-shaped structure which is adapted to be mounted to the housing of the powered cutting means so as to underlie the cutting means in a midportion thereof. The catching means further includes a forwardly projecting portion which may be U-shaped, and a rearwardly extending portion which may similarly be U-shaped.

A transverse upright wall maybe provided at the end of the rear shaped portion to prevent rearward movement of the cut vegetation from the catching means.

Thus, the catching means effectively defines an upwardly opening U-shaped channel which is also open at the front end to permit facilitated disposal of the collected cut vegetation from time to time as desired.

The catching means is arranged so that one leg thereof is closely adjacent the cutting plane of the cutting means whereby the U-shaped configuration extends substantially laterally and forwardly and rearwardly from the bottom of the cutting means.

The distal leg of the front portion of the catching means may extend upwardly a greater distance than the leg adjacent the cutting plane and may terminate in an outturned flange.

The trimmer may comprise a hand-held trimmer with the cutting means being attached to the soleplate thereof.

To permit use of the trimmer by a person remaining in an upright position, a wand, or elongated handle, may be removably secured to the grasping portion of the hand-held trimmer. Thus, the trimmer may be utilized readily in either mode of operation.

In the illustrated embodiment, the cutting means comprises a reciprocating cutting tooth form of trimmer.

The means for connecting the wand to the trimmer may be angularly adjustable for accommodation to the user's needs.

Thus, the vegetation trimmer of the present invention is extremely simple and economical of construction while yet providing the highly desirable features and advantages discussed above.

BRIEF DESCRIPTION OF THE DRAWINGS

Other features and advantages of the invention will be apparent from the following description taken in connection with the accompanying drawing wherein:

FIG. 1 is a fragmentary perspective view of a person utilizing a vegetation trimmer embodying the invention in an edging operation;

FIG. 2 is a fragmentary enlarged perspective view thereof;

FIG. 3 is a fragmentary enlarged perspective view taken at an angle to the perspective view of FIG. 2;

FIG. 4 is a fragmentary end view thereof as used in FIG. 1; and

FIG. 5 is a fragmentary end view thereof with the trimmer arranged in a different angular relationship to the ground and with the handle set in a different angular relationship to the trimmer.

DESCRIPTION OF THE PREFERRED EMBODIMENT

In the exemplary embodiment of the invention as disclosed in the drawing, a vegetation trimmer generally designated 10 is shown to include a powered cutting means generally designated 11 provided with a cuttings catching means generally designated 12 embodying the invention. A wand, or elongated handle, generally designated 13 is removably secured to the cutting means 11 by a selectively adjustable connector 14 permitting the trimmer to be utilized as by a person, such as person P illustrated in FIG. 1, while remaining in an upright position in effecting a lawn-edging or trimming operation.

As shown in FIG. 1, the cutting means is arranged to be moved along a preselected path 15 defining the edge of a grass area 16, or the like, intended to be edged by the cutting means. In effecting the trimming or edging operation, the cutting means effectively operates in an upright plane so that the cut ends of the vegetation, such as cut ends 16 illustrated in FIG. 2, tend to fall by gravity into the subjacent catcher 12.

In the illustrated embodiment, cutting means 11 comprises a generally conventional hand-held trimmer having a hand-grasping portion 17 of a housing generally designated 18 with the cutting elements 19 projecting forwardly from the housing, as best seen in FIG. 2. The cutting elements are arranged to cut in a cutting plane which, in the trimming operation, is an upright plane, as shown in FIG. 2. In the illustrated embodiment, the cutting elements comprise tooth cutting elements, it being understood that the invention comprehends the use of any suitable form of cutting means as is well known to those skilled in the art.

As shown in FIG. 3, housing 18 may define a soleplate portion 20 which, in the conventional hand-held use of the trimmer, defines the lower surface of the trimmer with the cutting blades 19 extending forwardly substantially parallel to the soleplate surface.

As best seen in FIG. 3, connector 14 comprises a pair of clips 21 and 22. A pair of mounting plates 23 and 24 are disposed at opposite sides of the grasping portion 17 and clamped thereto by means of elongated bolts 25 and 26 and cooperating nuts 27 and 28, respectively.

The lower end 29 of wand 13 is flatted and received between the clips. The end 29 is pivotally connected to the clips by a pivot bolt 30 and is locked in angularly adjusted position by means of a cooperating bolt 31 and wing nut 32. The bolt 31 extends through arcuate slots 33 in the clips at opposite sides of the handle portion 29 and the bolt 31 extends through a suitable hole (not shown) in the handle portion 29 and each of the slots 33 to permit a substantially 180° adjustment of the handle relative to the housing 18.

Different adjusted positions of the handle 13 relative to the housing 18 are illustrated in FIGS. 4 and 5. Thus, in FIG. 4, the cutting plane extends at an upright angle of approximately 60° to the horizontal, whereas in FIG. 5, the cutting plane extends perpendicularly thereto. The catching means 12 is adapted to catch the cut ends 16 in the different angularly adjusted positions of the cutting means.

More specifically, the catching means 12 defines a U-shaped channel member having a first U-shaped portion 34 underlying the cutting elements 19. Extending forwardly from the portion 34 is a front portion 35. The front portion may be U-shaped with the distal leg 36 thereof having an outturned upper end flange 37.

The catching means further defines a U-shaped rear portion 38 extending rearwardly from midportion 34 and terminating at its rearward end in an upright end wall 39 (FIG. 3) to prevent movement of the cut ends 16 rearwardly from the catching means.

One leg of the U-shaped channel is disposed in juxtaposed parallel relationship to the cutting plane of cutting elements 19 and for the purpose, is secured as by suitable bolts 40 to the soleplate portion 20 of the cutting means 11. Thus, as shown in FIG. 3, the leg 41 is provided with an upper extension 42 effectively overlying the soleplate 20 and through which the bolts 40 are extended to provide the secured association.

Thus, as best seen in FIGS. 2 and 3, the catching means 12 effectively defines an upwardly opening U-shaped catcher which is readily detachably mounted to the soleplate of the cutting means so as to extend substantially from the cutting plane to laterally thereof under the housing 18 for receiving the cut ends 16 of the vegetation being cut by the cutting blades 19. While the front end of the U-shaped structure is open, the closed rear end effectively causes the catching means to define a box-type configuration having substantial rigidity notwithstanding the formation thereof of relatively inexpensive and lightweight sheet material, such as sheet metal. Thus, the trimmer may be moved along the desired path 15 by sliding the catching means leg 41 along the edge of the lawn area L defining the desired edging boundary. The open front end of the U-shaped channel catching means may further serve to pick up loose objects in the path of the trimmer for facilitated disposal thereof together with the cut ends 16 of the vegetation.

The catching means may be readily removed from the trimmer when desired. Similarly, the handle 13 may be removed by simple removal of the connecting means 14, thereby permitting the trimmer to be used as a conventional hand-held trimmer when desired. In certain applications, the catching means 12 may be retained with the handle 13 removed so that the catching means may be utilized in the hand-held cutting operation for catching the clippings or cuttings as from bushes and the like.

The improved vegetation trimmer of the present invention is extremely simple while yet providing a highly improved catching of the cut material to provide a facilitated trimming operation eliminating the need for subsequent removal of the cut vegetation as by raking or the like.

The foregoing disclosure of specific embodiments is illustrative of the broad inventive concepts comprehended by the invention.

I claim:

1. In a vegetation trimmer having powered means for cutting in an upright cutting place, the improvement comprising
   means for catching the cut vegetation including an upwardly opening U-shaped collecting portion having a front portion underlying the bottom of said cutting means, said front U-shaped portion being defined by first and second upstanding legs, said first leg having a height substantially greater than said second leg, and an upwardly opening U-shaped rear portion extending from said front portion to substantially rearwardly of the bottom of said cutting means, said rear U-shaped portion being defined by third and fourth upstanding legs continuing rearwardly from said first and second legs, respectively, said fourth leg having a height substantially greater than said third leg, said powered cutting means being secured to said fourth leg and having cutting blades generally aligned with and extending above said second wall defining said cutting plane.

2. The vegetation trimmer structure of claim 1 wherein said rear portion defines an upright end wall for preventing movement of the collected cut vegetation rearwardly from said catching means.

3. The vegetation trimmer structure of claim 1 wherein said front portion first leg terminates upwardly in an outturned flange.

4. The vegetation trimmer structure of claim 1 wherein said powered cutting means defines a soleplate secured to said third leg.

5. In a vegetation trimmer having powered means for cutting in an upright cutting place, the improvement comprising
   means for catching the cut vegetation including an upwardly opening U-shaped collecting portion having a front portion uderlying the bottom of said cutting means, said front U-shaped portion being defined by first and second upstanding legs, said first leg having a height substantially greater than said second leg, and an upwardly opening U-shaped rear portion extending from said front portion to substantially rearwardly of the bottom of said cutting means, said rear U-shaped portion being defined by third and fourth upstanding legs continuing rearwardly from said first and second legs, respectively, said fourth leg having a height substantially greater than said third leg, said powered cutting means being secured to said fourth leg and having cutting blades generally aligned with and extending above said second wall defining said cutting plane, said powered cutting means comprising a hand-held trimming device having a grasping handle, said trimmer further including an elongated handle and means for detachably connecting said elongated handle to said grasping handle.

6. The vegetation trimmer structure of claim 5 wherein said means connecting said elongated handle to said grasping handle defines means for selectively adjustably securing said powered cutting means to said elongated handle about an axis parallel to said cutting plane.

* * * * *